(12) United States Patent
Chao (10) Patent No.: US 9,013,761 B2
(45) Date of Patent: Apr. 21, 2015

(54) SCANNER WITH A SCAN SENSOR HAVING A WIDTH SMALLER THAN THE PLATEN

(71) Applicant: Hewlett-Packard Development Company, L.P., Houston, TX (US)

(72) Inventor: Jang Wei Chao, Singapore (SG)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/863,536

(22) Filed: Apr. 16, 2013

(65) Prior Publication Data

US 2014/0307295 A1 Oct. 16, 2014

(51) Int. Cl.
 H04N 1/04 (2006.01)
 H04N 1/00 (2006.01)
(52) U.S. Cl.
 CPC ............. H04N 1/00519 (2013.01); H04N 1/04 (2013.01)
(58) Field of Classification Search
 USPC .......................................... 358/474, 497, 498
 See application file for complete search history.

(56) References Cited

U.S. PATENT DOCUMENTS

| | | | |
|---|---|---|---|
| 5,465,163 A | 11/1995 | Yoshihara et al. |
| 5,627,585 A | 5/1997 | Goldschmidt et al. |
| 5,841,549 A | 11/1998 | Munakata |
| 5,895,928 A | 4/1999 | Kerschner |
| 5,999,662 A | 12/1999 | Burt et al. |
| 6,002,492 A | 12/1999 | Kamon et al. |
| 6,147,780 A | 11/2000 | Chiang |
| 6,331,860 B1 | 12/2001 | Knox |
| 6,507,415 B1 | 1/2003 | Toyoda et al. |
| 6,636,335 B1 | 10/2003 | Tang et al. |
| 6,690,482 B1 | 2/2004 | Toyoda et al. |
| 6,694,065 B2 | 2/2004 | Kobara et al. |
| 6,961,145 B2 | 11/2005 | Smith |
| 6,975,434 B1 | 12/2005 | Pilu et al. |
| 7,136,199 B2 | 11/2006 | Cantwell |
| 7,333,250 B2 | 2/2008 | Spears et al. |
| 7,426,064 B2 | 9/2008 | Cunnigan et al. |
| 7,529,001 B2 | 5/2009 | Takahara |
| 7,733,539 B2 | 6/2010 | Edwards et al. |
| 8,223,408 B2 | 7/2012 | Lee et al. |
| 8,717,641 B2 * | 5/2014 | Yap et al. ....................... 358/497 |
| 2002/0131092 A1 | 9/2002 | Tanaka et al. |
| 2003/0081267 A1 | 5/2003 | Cantwell |
| 2003/0141443 A1 * | 7/2003 | Spears et al. .................. 250/234 |

(Continued)

FOREIGN PATENT DOCUMENTS

CN 101867678 10/2010
EP 0509333 10/1992

(Continued)

OTHER PUBLICATIONS

Bai, Y-W. et al., Design and Implementation of a Scanner with Stitching of Multiple Image Capture, (Research Paper), IEEE Transactions on Consumer Electronics, Nov. 2008. pp. 1501-1505. vol. 54. No. 4. http://dl.acm.ora/citation.cfm?id=2279776 > On.

(Continued)

*Primary Examiner* — Houshang Safaipour
(74) *Attorney, Agent, or Firm* — Hewlett-Packard Patent Department (57) ABSTRACT

A scanner is disclosed. The scanner has a scan sensor with a width smaller than the width of the platen. The scanner scans a first pass of the platen with the scan sensor in a first position on one side of the platen. The scanner then moves the scan sensor to the other side of the platen and does a second pass.

12 Claims, 7 Drawing Sheets

(56) References Cited

U.S. PATENT DOCUMENTS

| | | |
|---|---|---|
| 2004/0184118 A1 | 9/2004 | Sato |
| 2008/0024836 A1 | 1/2008 | Sundnes |
| 2010/0149605 A1 | 6/2010 | Kim |
| 2010/0296130 A1 | 11/2010 | Lee et al. |
| 2010/0296136 A1 | 11/2010 | Lee et al. |
| 2012/0286170 A1 | 11/2012 | Van De Peut et al. |

FOREIGN PATENT DOCUMENTS

| | | |
|---|---|---|
| KR | 20060134442 | 12/2006 |
| WO | WO-9207441 | 4/1992 |
| WO | WO-2012146358 | 11/2012 |

OTHER PUBLICATIONS

Scan-n-stich Deluxe, (Web Page). http://www.arcsoft.com/estore/software_title.asp?productCode=SNSD >, Jan. 4, 2013.

* cited by examiner

SCANNER WITH A SCAN SENSOR HAVING A WIDTH SMALLER THAN THE PLATEN

BACKGROUND

Scanners are used to create digital images of items place on the platen.

DETAILED DESCRIPTION

Scanners are used to create digital copies of papers, documents or objects placed on the platen. Papers come in many different sizes, for example letter, legal, ledger, A5, A4 and A3 sized papers. Most of the common page sizes used in the home or office have a width that is 8.5 inches or less, for example letter, legal, A5 and A4 pages all have a width of 8.5 inches or less. Because the most common paper sizes used in the home or office have widths of 8.5 inches or less, most home or office scanners have a platen that has a width slightly larger than 8.5 inches. The platen lengths very between 11 to 14 inches depending on if they are designed for letter or legal sized papers.

A user that has a need to scan wider papers can purchase a scanner that has an oversized platen, for example a B-sized scanner. A typical B-sized scanner has a platen that is slightly larger than 12×17 inches. This allows the scanner to accommodate both ledger or B-sized pages (11×17 inches) and A3 pages (11.7×16.5 inches). Unfortunately these scanners are typically much more expensive than a normal sized office scanner. One of the more expensive components of a B-sized scanner is the scan sensor.

The scan sensor in most scanners stretches across the full width of the scan platen. During a scan the scan sensor is swept down the length of the platen, or the page is moved relative to the scan sensor. This allows the scanner to capture an image of the full page in one pass. A typical office scanner has a scan sensor that is slightly larger than 8.5 inches. A B-sized scanner has a scan sensor that is slightly larger than 11.7 inches. Therefore the B-sized scanner has a scan sensor that is over 3 inches longer that the typical office scanner. Because the scan sensor is longer, and fewer of them are made, the scan sensor for the B-sized scanner is more expensive than the scan sensor in the typical office scanner. For contact image sensors (CIS) scanners the increase in cost is due to the increase in the number of sensor chips needed and the longer rod lens. required.

In one example, a scanner is provided that uses a scan sensor that is smaller than the width of the platen. The scanner has a B-sized platen and the scan sensor has a length smaller than the width of the platen, for example the scan sensor is 8.6 inches in length. The scan sensor is mounted in a carriage and can move between a position on one side of the carriage to a position on the other side of the carriage. The scanner scans the full width of the platen by making two scan passes, one on each side of the platen. The final image is then created by stitching the two images together.

Figure 1:
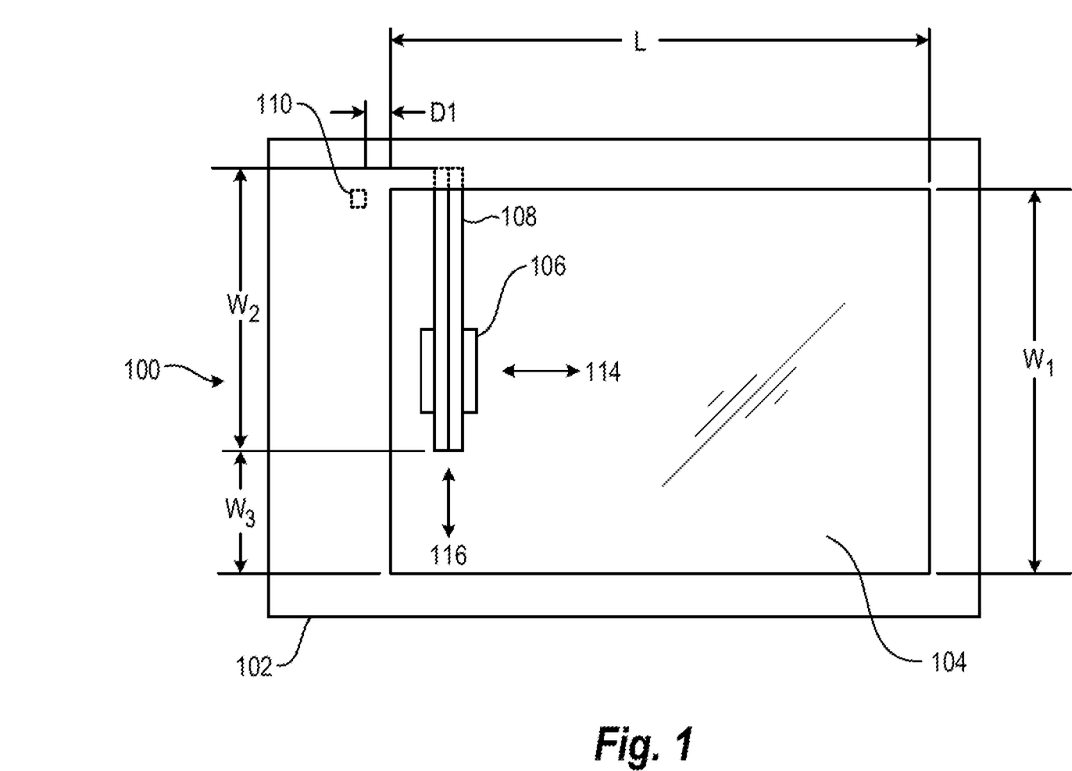
FIG. 1 is a top view of an example scanner 100.
Figure 2:
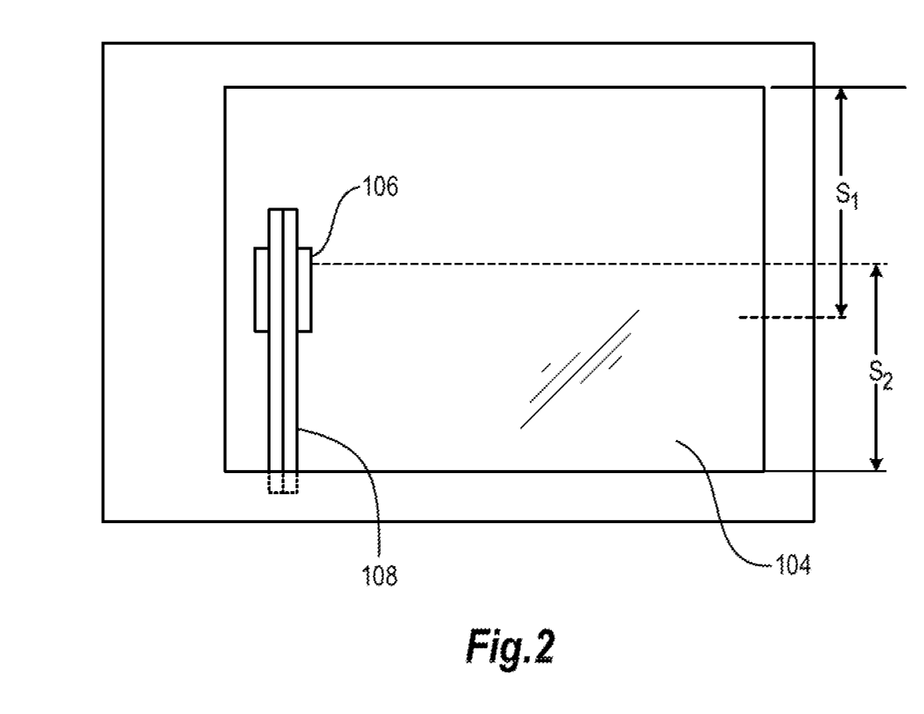
FIG. 2 is the example scanner of FIG. 1 with the scan sensor in the second position.

FIG. 1 is a top view of an example scanner 100. Scanner 100 comprises a top cover 102, a platen 104, a carriage 106, a scan sensor 108 and a reference mark 110. Platen 104 is mounted in top cover 102. Platen is fabricated from a transparent material, for example glass. Carriage 106 is located underneath the platen 104 and can move along the length of the scanner as shown by arrow 114. Scan sensor 108 is mounted in carriage 106 and can move between two positions along the axis shown by arrow 116. The first position (as shown) is on one side of the platen 104 near the reference mark 110. The second position is on the other side of the platen 104 (as shown in FIG. 2). Scanner 100 may also comprise a positioning system with motors, gears, guide rods and the like to move carriage 106 along the length of platen 104, but these items are not shown for clarity.

The platen 104 has a width W1 that can accommodate B-sized papers, for example 12 inches in width. Scan sensor 108 has a width W2 smaller than width W1, for example 8.7 inches in width. When a document that has a width of 8.5 inches or less is placed on the platen, the scanner can scan the document in a single pass using the full width of the scan sensor with the scan sensor located in the first position. When a document that has a width greater than 8.5 inches is placed on the platen, the scanner can scan the document using two passes. The first pass is done with the scan sensor located in the first position and the second pass is done with the scan sensor in the second position. The two scans are then stitched together to form the final image.

FIG. 2 is the example scanner of FIG. 1 with the scan sensor 108 in the second position. In one example the first scan pass may use the full width of the scan sensor W2 and the second pass may use a small subset of the width of the scan sensor W3 (see FIG. 1). In other examples each of the two passes are done using less than the full width of the scan sensor. The first pass may use width S1 and the second pass may use width S2, where S1 and S2 are both equal and larger than ½ the total width WI of the platen (see FIG. 2) For example, when the scan sensor is 8.7 inches wide, both scan passes may only use 6.77 inches of the scan sensor. Because the widths of both passes are greater than ½ the width W1 of the platen, there will be some overlap in the middle of the two scan passes. The overlap region may improve the stitching between the two scan passes. In other examples, there may not be any overlap between the widths of the two scan passes.

Reference mark 110 (see FIG. 1) is used to determine where to start the scan along the length of platen 104. Reference mark may be a feature on top cover 102 located within a tightly controlled distance D1 to the top edge of platen 104. In one example the reference mark may be a target than can be identified/located by scanning the underside of top cover using the scan sensor 108 in the first position. In other examples reference mark 110 may be a bracket containing an optical sensor that detects When a flag on the scan sensor 108 interrupts the optical beam of the sensor. Once the location of reference mark 110 has been determined, the position of the top edge of the platen will be known to within a tight tolerance. Therefore the scan can be started at the top edge of the platen when the scan sensor is in the first position. The scan can be ended after scanning a known length, for example 11, 14 or 17 inches.

When the scan sensor is moved from the first position to the second position for a two pass scan, mechanical tolerances may cause an offset of the scan sensor along the length of the scanner compared to the location of the scan sensor in the first position, a skew of the scan sensor with respect to the first position, or both. The offset and/or skew can cause the physical location of the starting and ending positions of the second pass to be shifted from the physical starting and ending locations of the first pass scan, even when the logical starting and ending locations are the same.

Figure 3:
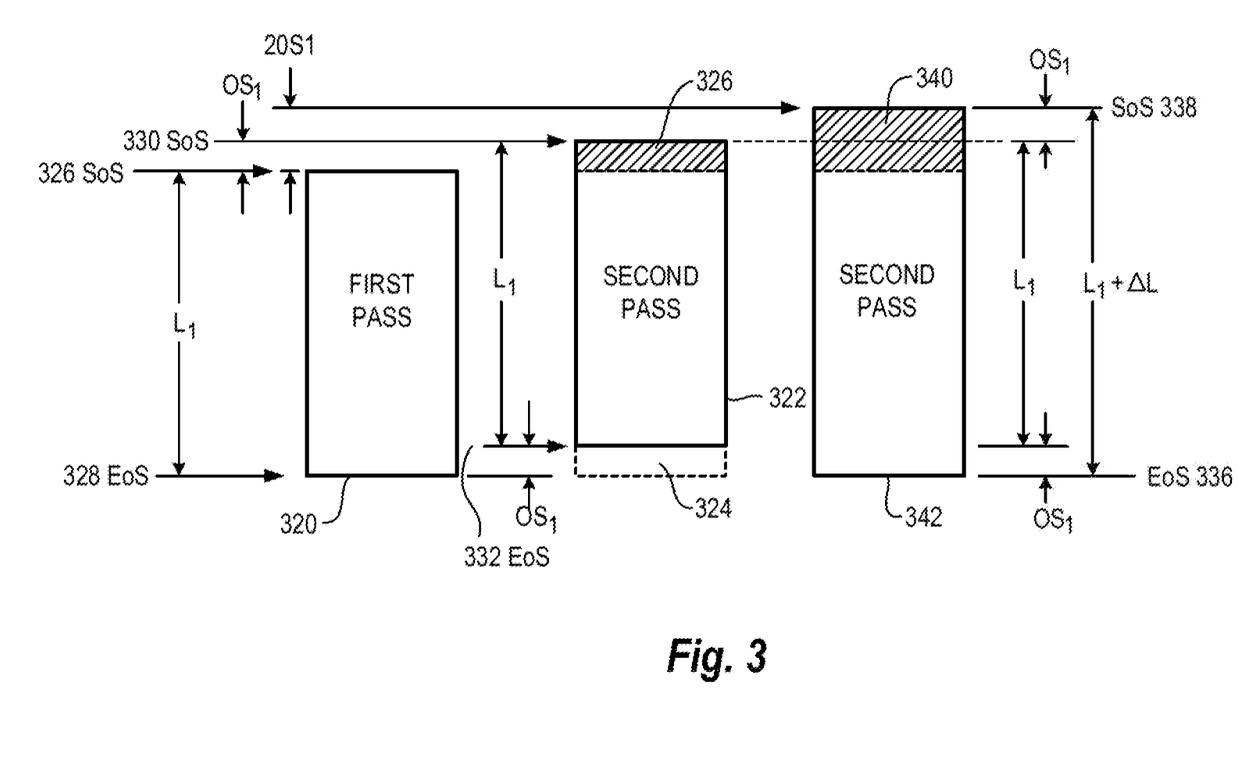
FIG. 3 is an example of a two pass scan.

FIG. 3 is an example of a two pass scan. The first pass was done with the scan sensor in the first position on one side of the scanner. The second pass was done with the scan sensor in the second position on the other side of the scanner. Both scan passes were started at the same logical location with respect to the reference mark 110. In one example the logical starting and ending locations are based on the number of motor steps between the reference mark and the top edge of the platen 104. In another example, a second reference mark may be located underneath the bezel on the opposite side of the scanner from reference mark 110. The logical start of the second pass may be located with respect to the second reference mark. This may help reduce the difference between the physical start positions of the two passes but the skew and mechanical tolerances may still cause an offset between the two passes.

The first pass 320 of the two pass scan has a start-of-scan (SoS) physical position 326 and an end-of-scan (EoS) physical position 328. Because the reference mark is located with the scan sensor in the first position and the first pass is done with the scan sensor in the first position, the physical SoS position 326 of the first pass may match the logical SoS position (e.g. the top edge of the platen). The first pass scan has a length L1. The second pass 322 of the two pass scan has a SoS physical position 330 and an EoS physical position 332. The second pass 322 has the same length L1 as the first pass 320. The mechanical offsets and/or skew of the scan sensor between position one and position two causes the physical start and end positions of the second pass to be different from the physical start and end locations of the first pass. Because of mechanical offsets and/or skew of the scan sensor between position one and position two, the SoS 330 and EoS 332 physical positions of the second pass 322 are displaced from the SoS 326 and EoS 328 positions of the first pass by offsets distance $OS_1$, even though the logical start and end positions of the second pass are the same as the logical start and end positions of the first pass.

The second pass has been offset upwards from the first pass by offset $OS_1$ due to the mechanical offsets and/or skew of the scan sensor between position one and position two. Therefore the top section 326 of the second pass will contain an image of the bottom side of top cover 102. The second pass will end before the physical EoS position 328 of the first pass. When the two images from the two scan passes are stitched together using the first scan pass as the reference image, the top offset area 326 in the second pass will be truncated and the lower offset area 324 in the second pass will be filled in with blank data. This will cause one side of the final image to have incomplete data. In other examples, the second pass may be offset downwards compared to the first pass causing blank data to be inserted on the top side of the second pass.

In one example, a scanner will be provided that will scan the first pass using a first length and scan the second pass using a second, longer length. The second, longer length will overlap each end of the first pass scan. By using a longer length scan for the second pass, and overlapping each end, the second pass can be aligned with the first pass without inserting blank data. Second pass 342 is an example of a second pass with a length $L1+\Delta L$ that is longer than the length L1 of the first pass 320. The second pass will have a logical SoS position that occurs before the logical SoS position of the first pass and will have a logical EoS location that will occur after the logical EoS location of the first pass.

Second pass 342 has a SoS physical position 338 and an EoS physical position 336 and a length $L1+\Delta L$. The length $\Delta L$ is equal to two times the offset length $OS_1$. The length of the second pass 342 has been increased by starting the logical position of the second pass 342 by the distance $OS_1$ before the start of the logical position of the first pass 320. The length has also been increased by ending the second pass 342 by a distance $OS_1$ after the logical end of the first pass 320.

Because of mechanical offsets and/or skew of the scan sensor between position one and position two, and because the second pass 342 was started by a logical distance $OS_1$ before the logical start of the first pass 320, the SoS 338 physical positions of the second pass 342 is displaced from the SoS 326 physical positions of the first pass by two times offsets distance $OS_1$. Because of mechanical offsets and/or skew of the scan sensor between position one and position two, and because the second pass 342 was ended by a logical distance $OS_1$ after the logical end of the first pass 320, the EoS physical position 336 of the second pass 342 is aligned with the EoS physical position 328 of the first pass 320. When the first pass 320 is stitched together with the second pass 342, the top area of the second pass 342 will be truncated and the bottom edge of the two passes will align. Therefore the second side of the final image will not contain blank data.

The example shown in FIG. 3 shows $\Delta L$ as equal to two times the offset length $OS_1$. This causes the physical EoS 336 of the second pass to exactly align with the physical EoS 328 of the first pass. In actual practice the distance $\Delta L$ will be chosen such that there will always be some overlap of each end of the second pass with respect to the first pass. This will ensure that no blank areas in the final image.

Figure 4:
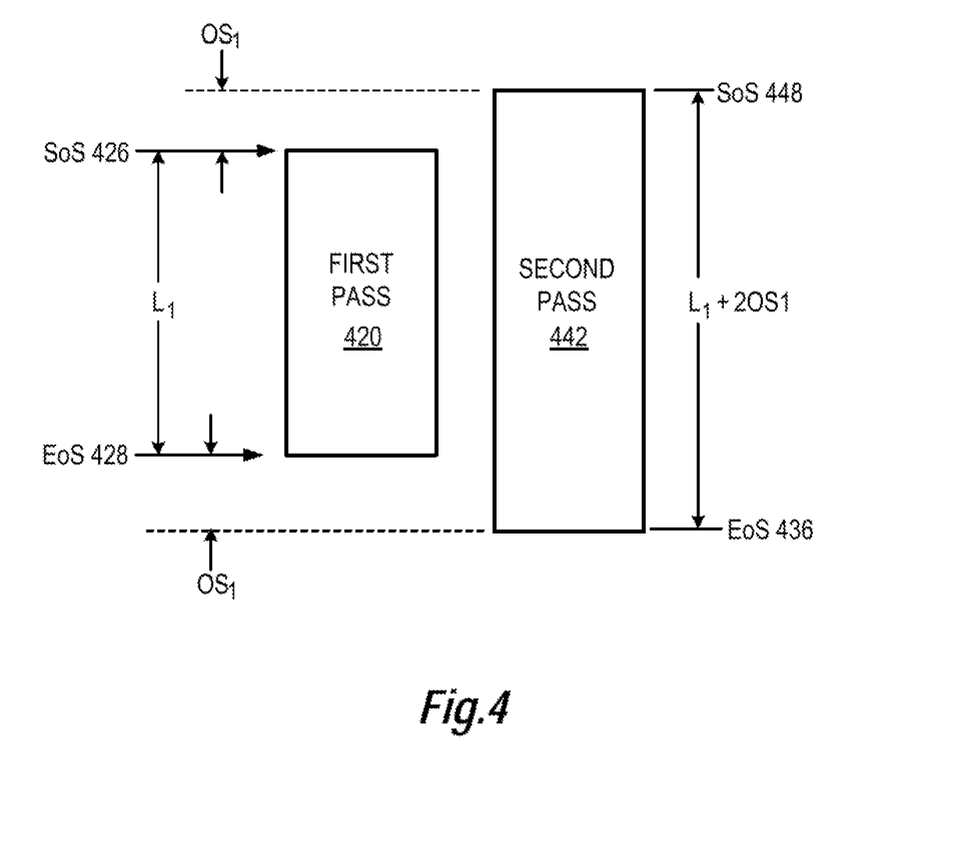
FIG. 4 is an example of a two pass scan with no mechanical offsets and/or skew of the scan sensor between position one and position two.

FIG. 4 is an example of a two pass scan with no mechanical offsets and/or skew of the scan sensor between position one and position two. When there is no mechanical offsets and/or skew of the scan sensor between position one and position two, the physical location for the start and end of the second pass will align with the logical start and end locations of the second pass. The first pass 420 has a SoS position 426 and an EoS position 428 with a length of L1. The second pass has a SoS position 448 and an EoS position 436 with a length of $L1+2\ OS1$. The second scan was started before the first pass by offset distance $OS_1$. The second pass was ended beyond the end of the first pass by offset distance $OS_1$. Because there was no mechanical offsets and/or skew of the scan sensor between position one and position two, the SoS position of the second pass 442 is offset upwards from the SoS position 426 by distance $OS_1$. Because there was no mechanical offsets and/or skew of the scan sensor between position one and position two, the EoS position 436 of the second pass 442 is offset downwards from the SoS position 128 of the first pass 420 by distance $OS_1$.

Offset distance $OS_1$ is selected such that even when there is a maximum amount of mechanical offsets and skew of the Sean sensor between position one and position two, the SoS physical position 448 of the second pass 442 will still occur before the SoS physical position 426 of the first pass 420. In some examples the maximum amount of displacement and skew is between 1.5 mm to 4 mm, for example 2.6 mm. Therefore by starting the second pass by 2.6 mm before the first pass, and by extending the second pass beyond the first pass by 2.6 mm, the two passes can always be stitched together without using blank data.

Figure 5:
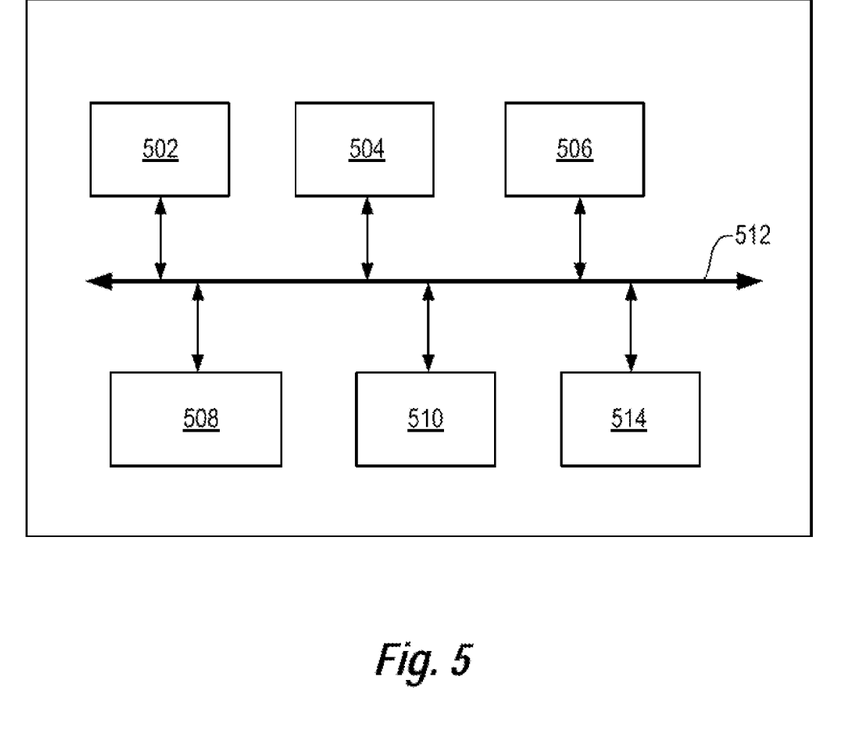
FIG. 5 is an example block diagram of a Scanner.

FIG. 5 is an example block diagram of a Scanner. Scanner comprises a processor 502, memory 504, input/output (I/O) module 506, display 508, controller 510 and scan engine 514 all coupled together on bus 512. In some examples scanner may also have a user interface module, an input device, and the like, but these items are not shown for clarity. Processor 502 may comprise a central processing unit (CPU), a microprocessor. an application specific integrated circuit (ASIC), or a combination of these devices. Memory 504 may comprise volatile memory, non-volatile memory, and a storage device. Memory 504 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 506 is used to couple scanner to other devices, for example the Internet or a computer. Scanner has code, typically called firmware, stored in the memory 504. The firmware is stored as computer readable instructions in the non-transitory computer readable medium (i.e., the memory 504). Processor 502 generally retrieves and executes the instructions stored in the non-transitory computer-readable medium to operate the scanner and to execute functions. In one example, processor executes code that scans an image with the scanner.

Figure 6:
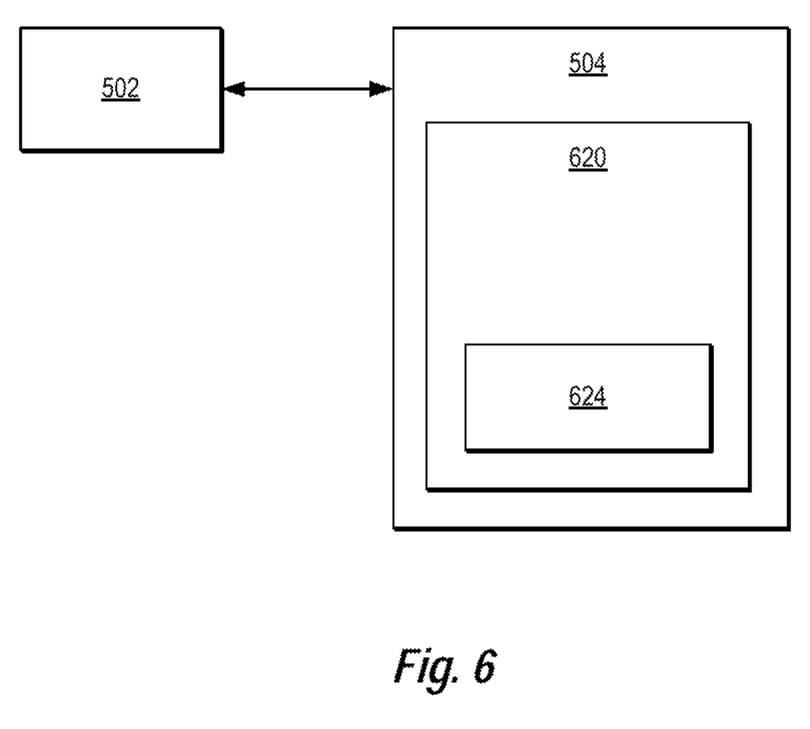
FIG. 6 is an example block diagram of the processor 502 coupled to memory 504.

FIG. 6 is an example block diagram of the processor 502 coupled to memory 504. Memory 504 contains firmware 620. Firmware 620 contains a scan module 624. The processor 502 executes the code in scan module 624 to scan an image using two passes with the scanner.

Figure 7:
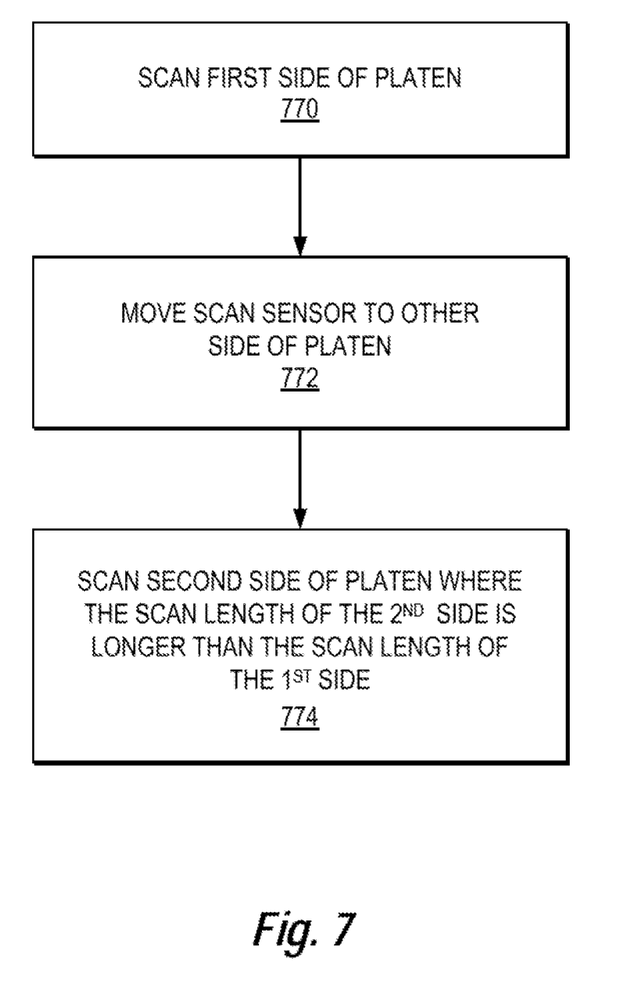
FIG. 7 is an example flow chart for two pass scanning.

FIG. 7 is an example flow chart for two pass scanning. At box 770 the scanner scans a first side of a platen with a scan sensor having a width smaller than a width of the platen, wherein the scan is along a length of the platen. At box 772 the scan sensor is moved to a second side of the platen opposite the first side. At box 774 the second side of the platen is scanned, wherein the scan of the second side is longer than the length of the scan of the first side and overlaps each end of the scan of the first side.

In the examples above, the scan sensor in both the first and second passes travel in the same direction (e.g., down the length of the platen). In other examples, the scan sensor may move down the length of the platen for the first pass, and may move back up the length of the platen for the second pass (after the scan sensor has been moved from the first position to the second position).

What is claimed is:

1. A scanner, comprising:
  a platen having a first width and a length;
  a scan sensor having a second width smaller than the first width, the scan sensor mounted in a carriage and movable perpendicular to the length from a first position on one side of the carriage to a second position on another side of the carriage, the carriage moveable along the length of the platen by a drive system;
  a controller coupled to the drive system and the scan sensor, the controller to scan a first pass along the length of the platen using the scan sensor in the first position, the controller starting the first pass at a first logical start location and ending the first pass at a first logical end location;
  the controller to scan a second pass along the length of the platen using the scan sensor in the second position, the controller starting the second pass at a second logical start location before the first logical start location and ending the second pass at a second logical end location after the first logical end location.

2. The scanner of claim 1, wherein the second width is larger than one half the first width.

3. The scanner of claim 1, wherein the second logical start location is between 1 and 4 mm before the first logical start position.

4. The scanner of claim 1, wherein, the second logical start location is 2.6 mm before the first logical start position.

5. The scanner of claim 1, wherein the second logical start location is underneath a top bezel.

6. The scanner of claim 1, further comprising:
  the controller to aligning data from the first and second passes and to truncate data from at least one end of the data from the second pass such that a scan length of the second pass data equals a scan length of the first pass data.

7. The scanner of claim 1, wherein the scan sensor travels in the same direction for the first and second passes.

8. A method of scanning, comprising:
  scanning a first pass on one side of a platen with a scan sensor having a width smaller than a width of the platen, wherein the scan is along a length of the platen;
  moving the scan sensor to a second side of the platen opposite the first side;
  scanning a second pass on the second side of the platen, wherein a scan length of the second side is longer than a scan length of the first side and the scan length of the second side overlaps each end of the scan length of the first side.

9. The method of scanning of claim 8, wherein the scan of the second side overlaps the start of the scan of the first side by between 1 and 4 mm and where the scan of the second side overlaps the end of the scan of the first side by between 1 and 4 mm.

10. The method of scanning of claim 8, wherein the scan of the second side overlaps the start of the scan of the first side by 2.6 mm and where the scan of the second side overlaps the end of the scan of the first side by 2.6 mm.

11. The method of scanning of claim 8, further comprising:
  aligning the scan of the first side to the scan of the second side and stitching the two scans together;
  truncating at least one end of the scan of the second side to match the length of the scan of the first side.

12. The method of scanning of claim 8, wherein the scan sensor travels in a first direction when scanning the first side and travels in a second, opposite direction when scanning the second side.

* * * * *

UNITED STATES PATENT AND TRADEMARK OFFICE
CERTIFICATE OF CORRECTION

| | | |
|---|---|---|
| PATENT NO. | : 9,013,761 B2 | Page 1 of 1 |
| APPLICATION NO. | : 13/863536 | |
| DATED | : April 21, 2015 | |
| INVENTOR(S) | : Chao | |

It is certified that error appears in the above-identified patent and that said Letters Patent is hereby corrected as shown below:

In the Claims

In column 6, line 17, in Claim 4, delete "wherein," and insert -- wherein --, therefor.

Signed and Sealed this
First Day of March, 2016

Michelle K. Lee
*Director of the United States Patent and Trademark Office*